(12) United States Patent
Krückemeier (10) Patent No.: US 9,727,582 B2
(45) Date of Patent: Aug. 8, 2017

(54) PROVIDING PHOTO HEAT MAPS

(71) Applicant: Google Inc., Mountain View, CA (US)

(72) Inventor: Nils Krückemeier, Schleswig-Holstein (DE)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 14/182,687

(22) Filed: Feb. 18, 2014

(65) Prior Publication Data

US 2015/0234864 A1    Aug. 20, 2015

(51) Int. Cl.
*G06F 17/30* (2006.01)
*G06K 9/00* (2006.01)

(52) U.S. Cl.
CPC .. *G06F 17/30268* (2013.01); *G06F 17/30864* (2013.01); *G06K 9/00677* (2013.01)

(58) Field of Classification Search
CPC .......... G06F 17/30268; G06K 9/00677; G06Q 50/01; G06Q 30/02; G06Q 10/101; G06Q 10/0637; G06Q 10/0833; G06Q 10/087; G06Q 10/103; G06Q 20/12; G06Q 20/204; G06Q 20/40; G06Q 30/0269; G06Q 30/06; G06Q 30/0601; G06Q 30/0633
USPC ....................................................... 707/725
See application file for complete search history.

(56) References Cited

U.S. PATENT DOCUMENTS

| | | | |
|---|---|---|---|
| 7,461,077 B1 * | 12/2008 | Greenwood | .......... G06F 3/0482 707/802 |
| 2007/0100547 A1 | 5/2007 | Chang | |
| 2012/0215903 A1 * | 8/2012 | Fleischman | ........ G06Q 30/0201 709/224 |
| 2013/0085893 A1 | 4/2013 | Bhardwaj et al. | |
| 2013/0093768 A1 | 4/2013 | Lockerman et al. | |
| 2013/0275894 A1 | 10/2013 | Bell et al. | |
| 2013/0332068 A1 | 12/2013 | Kesar et al. | |
| 2014/0351263 A1 * | 11/2014 | McConnell | ....... G06F 17/30699 707/748 |

OTHER PUBLICATIONS

Wang Jingya et al.; "Observing the Natural World with Flickr;" 2013 IEEE International Conference on Computer Vision Workshops; Dec. 2, 2013; pp. 452-459; IEEE.
European Patent Office; International Search Report and Written Opinion related PCT/US2015/014365; dated Apr. 16, 2015; 11 pages.
International Bureau of WIPO, International Preliminary Report on Patentability for International Patent Application No. PCT/US2015/014365, Aug. 23, 2016, 6 pages.

* cited by examiner

*Primary Examiner* — Shahid Alam
(74) *Attorney, Agent, or Firm* — IP Spring (57) ABSTRACT

Implementations generally relate to providing photo heat maps. In some implementations, a method includes collecting photos associated with at least one object, where the photos are collected from a plurality of users. The method further includes determining heat map information associated with the photos. The method further includes generating a heat map based on the heat map information, where the heat map indicates a quantity associated with the at least one object and associated with one or more geographic regions.

20 Claims, 8 Drawing Sheets

Grizzly bear

702

Animal

The grizzly bear is any North American subspecies of the brown bear, such as the mainland grizzly, the Kodiak, the peninsular grizzly and the recently extinct California grizzly. Wikipedia

Scientific name: Ursus arctos horribilis

Height: 102 cm on average (At Shoulder, Adult)

Lifespan: 20 – 25 y (In Wild)

Higher classification: Brown bear

Hibernation period: 152.2 – 213.1 d

Gestation period: 180 – 250 d

Mass: 544 kg (Alaska population, Adult), more

PROVIDING PHOTO HEAT MAPS

BACKGROUND

Various activities such as the building of damns, the clearing of forests, setting up nature protection areas, fighting pollution, etc. have impacted the environment around the world. One impact has been to alter the populations of various animals. For example, a particular species may have become endangered or no longer endangered, depending on changes to the environment. Another impact has been for animals to search for new habitats due to changes in the environment. For example, if a forest is cleared, inhabitants must search for new habitats in order to survive.

SUMMARY

Implementations generally relate to providing photo heat maps. In some implementations, a method includes collecting photos associated with at least one object, where the photos are collected from a plurality of users. The method further includes determining heat map information associated with the photos. The method further includes generating a heat map based on the heat map information, where the heat map indicates a quantity associated with the at least one object and associated with one or more geographic regions.

With further regard to the method, in some implementations, the heat map information includes geolocation information for each photo. In some implementations, the heat map information includes time stamp information for each photo. In some implementations, the heat map information includes metadata associated with the at least one object. In some implementations, the at least one object is an animal. In some implementations, the method further includes recognizing the least one object in the photos, and determining the heat map information associated with the photos containing the at least one object. In some implementations, the method further includes updating the heat map based on timestamp information associated with the photos containing the at least one object. In some implementations, the method further includes updating the heat map based on geolocation information associated with the photos containing the at least one object. In some implementations, method further includes displaying the heat map to a target user based on one or more criteria, and updating the heat map based on user input.

In some implementations, a method includes collecting photos associated with at least one object, where the photos are collected from a plurality of users. The method further includes determining heat map information associated with the photos, where the heat map information includes geolocation information and time stamp information for each photo. The method further includes generating a heat map based on the heat map information, where the heat map indicates a quantity associated with the at least one object and associated with one or more geographic regions. The method further includes updating the heat map based on timestamp information associated with the photos containing the at least one object.

With further regard to the method, in some implementations, the heat map information includes metadata associated with the at least one object. In some implementations, the method further includes updating the heat map based on geolocation information associated with the photos containing the at least one object. In some implementations, the method further includes displaying the heat map to a user based on one or more criteria, and updating the heat map based on user input.

In some implementations, a system includes one or more processors, and logic encoded in one or more tangible media for execution by the one or more processors. When executed, the logic is operable to perform operations including: collecting photos associated with at least one object, where the photos are collected from a plurality of users; determining heat map information associated with the photos; and generating a heat map based on the heat map information, where the heat map indicates a quantity associated with the at least one object and associated with one or more geographic regions.

With further regard to the system, in some implementations, the heat map information includes geolocation information for each photo. In some implementations, the heat map information includes time stamp information for each photo. In some implementations, the heat map information includes metadata associated with the at least one object. In some implementations, the at least one object is an animal. In some implementations, the logic when executed is further operable to perform operations including recognizing the least one object in the photos, and determining the heat map information associated with the photos containing the at least one object. In some implementations, the logic when executed is further operable to perform operations including updating the heat map based on timestamp information associated with the photos containing the at least one object.

DETAILED DESCRIPTION

Implementations described herein provide photo heat maps. In various implementations, a system collects photos associated with an object such as an animal, plant, etc., where the photos are collected from multiple users. The system then determines heat map information associated with the photos. In some implementations, the heat map information includes geolocation information for each photo, time stamp information for each photo, and metadata associated with the object. The system then generates a heat map based on the heat map information, where the heat map indicates a quantity or population density associated with the object and associated with one or more geographic regions.

In some implementations, the system further updates the heat map based on timestamp information associated with the photos containing the object and/or based on geolocation information associated with the photos containing the object. In some implementations, the system displays the heat map to a user based on one or more criteria and updates the heat map based on user input.

In various implementations, the heat map enables users to estimate the growth rates of a species over time using photos. The heat map also enables users to observe changes in habitats of particular species over time using photos.

Figure 1:
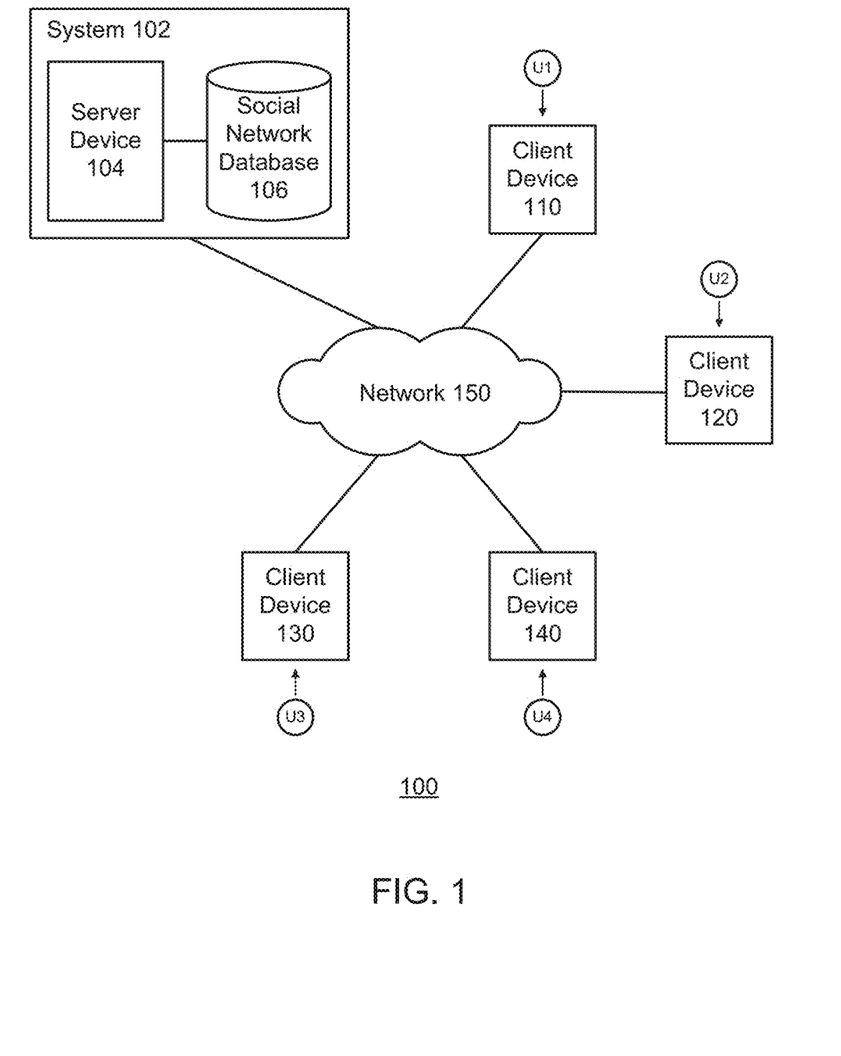
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may provide photos and view heat maps to systems 102 using respective client devices 110, 120, 130, and 140.

In the various implementations described herein, processor of system 102 causes the elements described herein (e.g., heat maps, controls for heat maps, etc.) to be displayed in a user interface on one or more display screens.

While some implementations are described herein in the context of a social network system, these implementations may apply in contexts other than a social network. For example, implementations may apply to search engines generally. For example, system 102 may perform the implementations described herein on a stand-alone computer, tablet computer, smartphone, etc.

Figure 2:
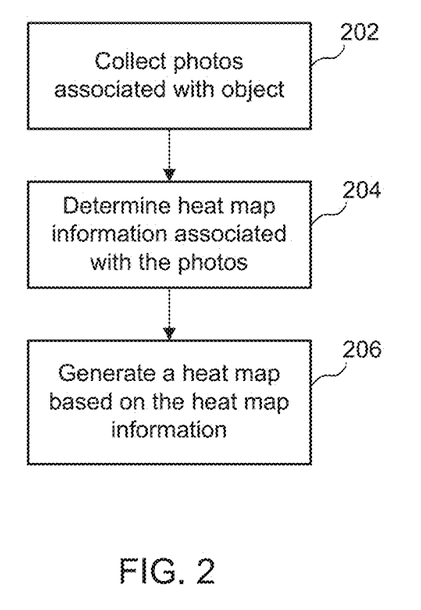
FIG. 2 illustrates an example simplified flow diagram for providing photo heat maps, according to some implementations.

FIG. 2 illustrates an example simplified flow diagram for providing photo heat maps, according to some implementations. As described in more detail below, system 102 generates a heat map that shows the frequency of occurrence of particular objects such as species of animals or plants in particular geographic regions. In various implementations, a heat map is a graphical representation of data where the individual values contained in a matrix or table are represented as colors or shading. In various implementations, the colors correspond to the level of the measurement. For example, the color red or a dark shading may correspond to a high level of measurement. The color yellow or a light shading may correspond to a low level of measurement. As described in more detail below, the higher number of photos of a particular object associated with a particular geographic location correspond to higher level of measurement. The lower number of photos of a particular object associated with a particular geographic location correspond to lower level of measurement. Note that the term "heat" does not imply that temperature is visualized but rather other quantities, such as frequency of occurrence, etc. As described in more detail below, in various implementations, such quantities may include population or population densities, etc. System 102 also provides a user interface to enable a user to view the heat map and to manipulate aspects of the heat map.

Referring to both FIGS. 1 and 2, a method is initiated in block 202, where system 102 collects photos associated with at least one object, where the photos are collected from multiple users. In some implementations, system 102 receives photos from users when users upload images to system 102 and/or after users add images to photo albums. In some implementations, system 102 enables camera devices (e.g., smart phones) of users to automatically upload images to system 102 as the camera devices capture photos. In some implementations, system 102 may search existing databases associated and/or accessible to system 102 in order to collect photos. Accordingly, system 102 may collect an immense amount of photos and photo data associated with a particular object.

In various implementations, system 102 first recognizes an object (e.g., a target object such as a particular animal) in the photos. System 102 then associates the object with at least one category or classification. For example, the category may be one of various classifications (e.g., a bearded dragon, a grizzly bear, etc.). System 102 then identifies other photos containing objects associated with the category, and retrieves those identified photos.

Figure 3:
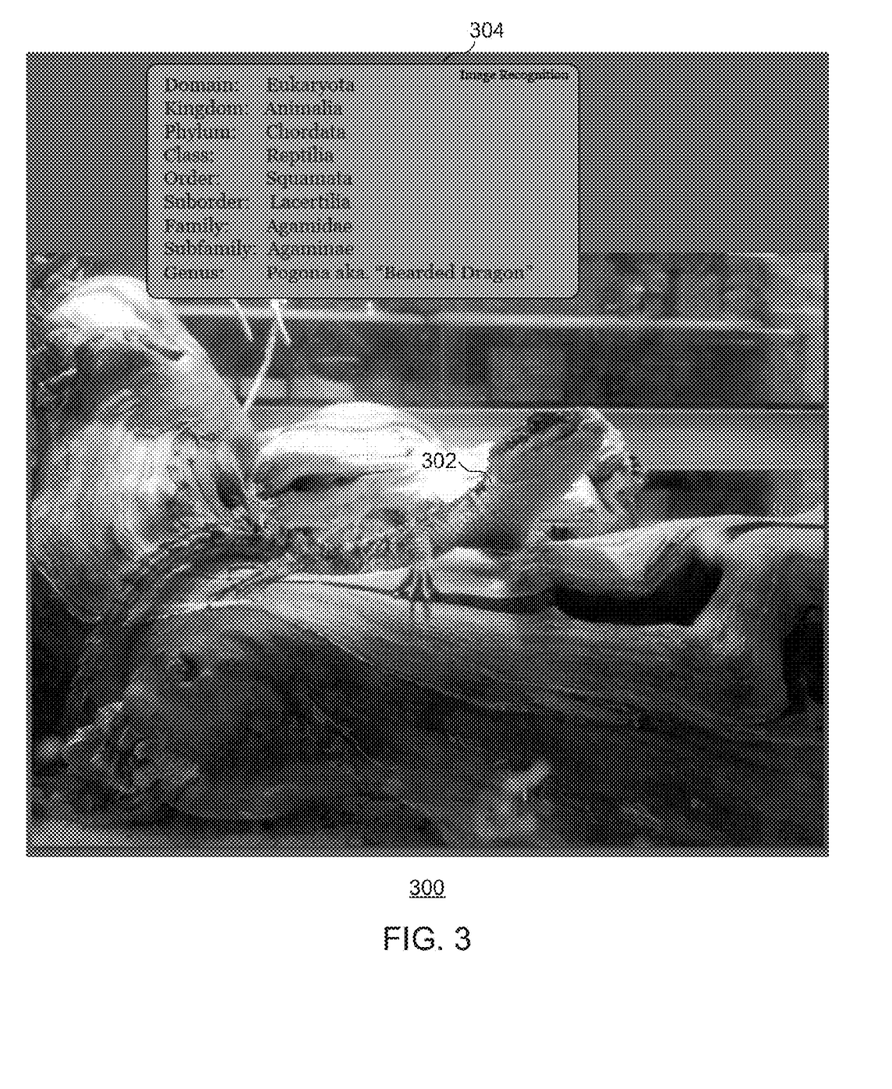
FIG. 3 illustrates an example photo of an animal, according to some implementations.

FIG. 3 illustrates an example photo 300 of an animal, according to some implementations. In this particular example, photo 300 shows an animal 302 known as a bearded dragon. Also, shown overlaying photo 300 is a box 304 that indicates classifications of animal 302. For example, box 304 shows the domain, kingdom, phylum, class, order, suborder, family, subfamily, and genus. These are example classifications. In some implementations, box 304 need not show all of these classifications. In some implementations, box 304 may include other classifications. For example, in some implementations, box 304 may also show the species of the object.

In various implementations, system 102 determines such information by first recognizing the target object (e.g., animal 302, etc.). System 102 may utilize any suitable recognition algorithm to determine if the content (e.g., a particular object) is shown in a given photo (e.g., photo 300) or shown in multiple photos. Example implementations of recognition algorithms are described in more detail below.

For ease of illustration, some implementations are described herein in the context of photos associated with an object. In various implementations, the object may represent an object classification or category. For example, a number of photos may include images of bearded dragons, where each photo shows a bearded dragon. A particular bearded dragon shown in one photo may be different from a bearded dragon shown in another photo. In other words, the object (e.g., a bearded dragon) may represent a classification of animal (e.g., a genus such as a bearded dragon).

While the object shown in FIG. 3 is a bearded dragon, objects may be any type of fauna including birds, mammals, reptiles, etc. For example, some example implementations below, the object is a grizzly bear. Objects may also be any type of flora including plants, trees, etc. Objects may also include other objects such as buildings, monuments, or any items that may be photographed and of interest to photographers.

These implementations and others may also apply to photos associated multiple objects. Similarly, these implementations and others may also apply to different photos associated with different objects.

In block 204, system 102 determines heat map information associated with the photos. In some implementations, the heat map information may include geolocation information for each photo. In some implementations, the heat map information may include time stamp information for each photo. In some implementations, the heat map information may include metadata associated with the object in the photos.

Figure 4:
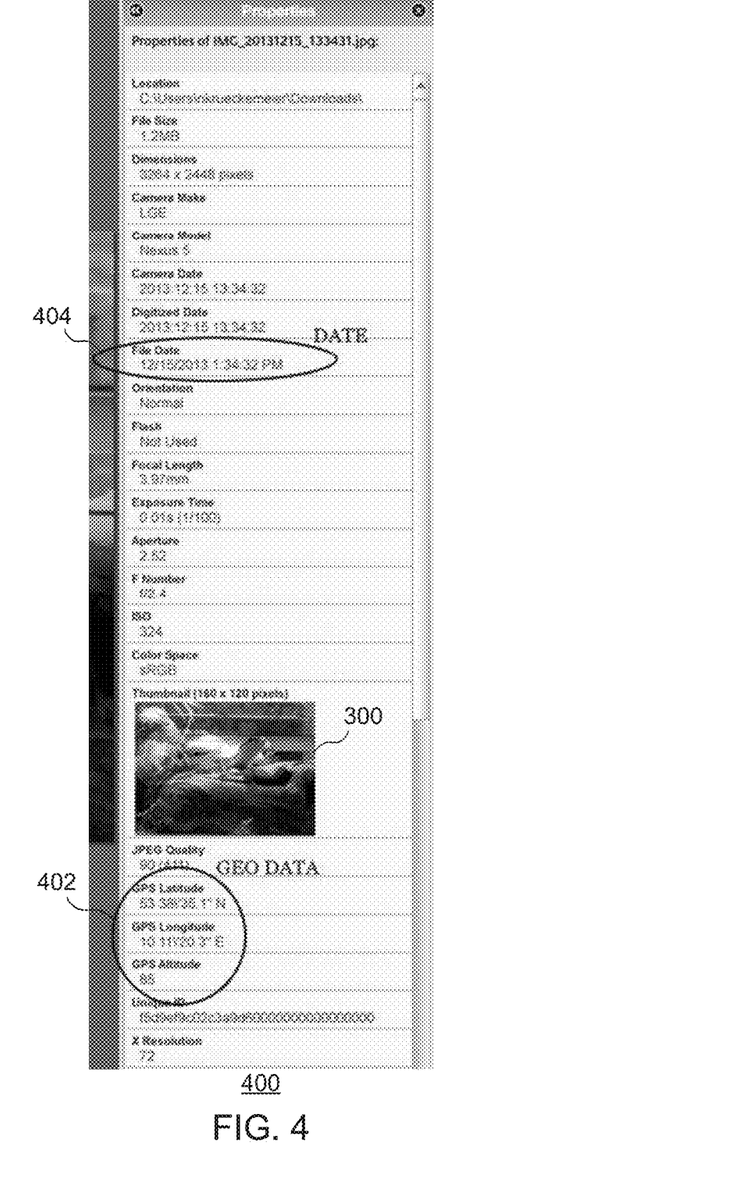
FIG. 4 illustrates heat map information, according to some implementations.

FIG. 4 illustrates example heat map information 400, according to some implementations. As shown, heat map information 400 includes geolocation information 402 associated with photo 300. Geolocation information 402 may include GPS latitude, GPS longitude, GPS altitude, etc.

Heat map information 400 also includes time stamp information 404. Time stamp information 404 may include month, day, year, hour, minute, second, etc.

Heat map information 400 also includes metadata associated with the object in the photo. For example, with regard to the bearded dragon example, the heat map information may include classification information such as the classification information described in connection with FIG. 3 (e.g., domain, kingdom, phylum, class, order, suborder, family, subfamily, genus, species, etc.)

Heat map information 400 also includes other metadata. Such metadata may include other information associated with the photo such as location of the photo, file size, dimensions, etc. Such metadata may include information associated with the camera device used to take the photo (e.g., camera make, camera model, etc.).

As indicated above, while the example object is described in the context of a particular animal (e.g., a bearded dragon), in various implementations, the object may be any type of fauna including birds, mammals, reptiles, etc. In various implementations, the objects may also be any type of flora including plants, trees, etc. In various implementations, the object may also be any type of inanimate object such as a building, a monument, or any item or phenomena that may be photographed and of interest to a photographer.

In block 206, system 102 generates a heat map based on the heat map information. For example, in some implementations, system 102 may access a map that includes the geolocations associated with a target object (e.g., the grizzly bear). System 102 then maps the photos associated with the object to the map. In various implementations, system 102 may shade geographic regions (e.g., portions of the map) with a predetermined shading, pattern, color, color scheme, etc. based on the occurrence of photos associated with a particular region. The heat map shows the quantities of photos taken at different locations. Hence, in various implementations, the heat map indicates a quantity associated with the at least one object and associated with one or more geographic regions. In various implementations, the quantity may be a population density. Example implementations of heat maps are described in more detail below in connection with FIGS. 5 and 6.

Figure 5:
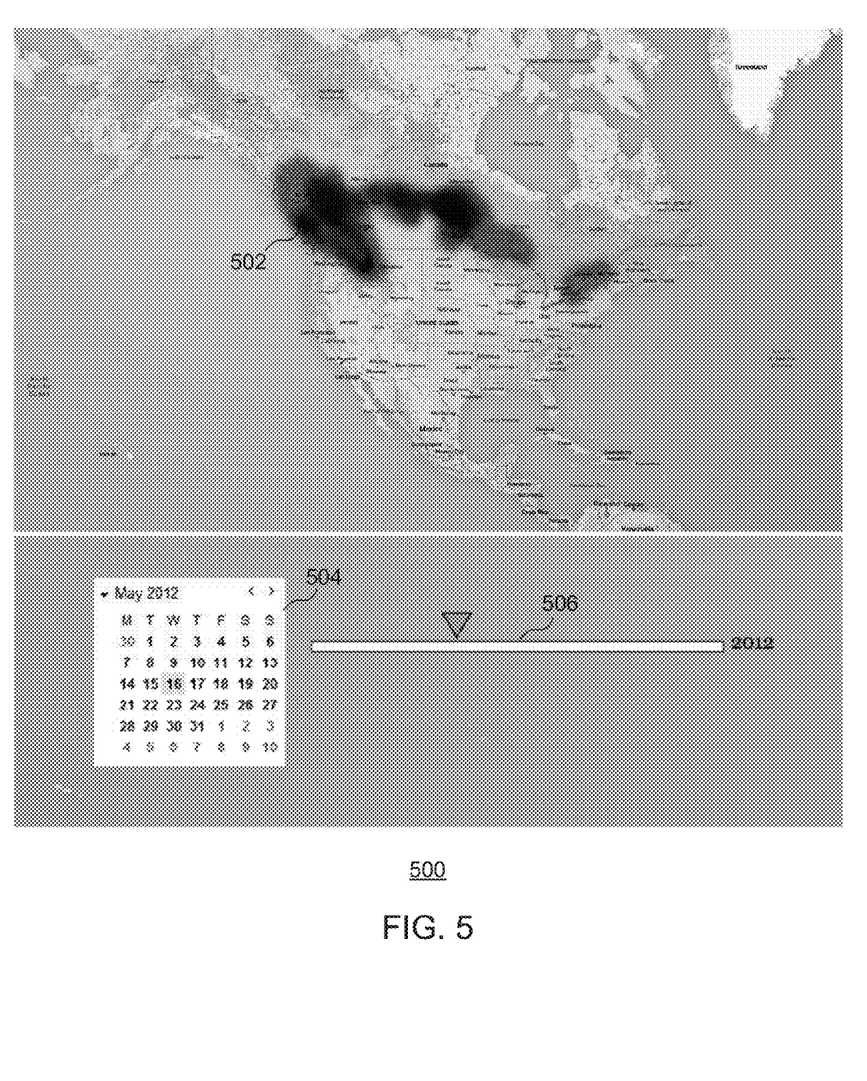
FIG. 5 illustrates an example heat map, according to some implementations.

FIG. 5 illustrates an example heat map 500, according to some implementations. As shown, heat map 500 indicates a quantity associated with an object (e.g., the grizzly bear) and associated with one or more geographic regions. In various implementations, the number of photos is indicative of and reflects the population density. For example, numerous photos of grizzly bears taken in a particular geographic region indicates a higher population density of grizzly bears in that geographic region. As such, the shading/colors of the heat map would reflect the higher number of photos and thus the higher population density. Conversely, fewer photos of grizzly bears taken in a particular geographic region indicates a lower population density of grizzly bears in that geographic region. As such, the shading/colors of the heat map would reflect the lower number of photos and thus the higher population density. In various implementations, the quantity is a population or population density. For example, the shaded areas 502 on the map indicate locations where grizzly bears were sited and photographed by people. In various implementations, the degree of shading or colors indicate the population density of the particular object. Here, geographic regions with darker shading indicate a higher population density. Regions with less dark shading indicate a medium population density. Regions with light shading indicate a lower population density.

In various implementations, system 102 also updates the heat map based on various information. For example, system 102 may update the heat map based at least in part on timestamp information associated with the photos containing the at least one object. In some implementations, system 102 may also update the heat map based at least in part geolocation information associated with the photos containing the at least one object. In various implementations, system 102 may update the heat map based on a combination of timestamp information and geolocation information. As system 102 collects more photos of a given object, system 102 updates the heat map.

In some implementations, system 102 may also cause a calendar 504 to be displayed in the user interface. In this example, calendar 504 shows a date of May 16, 2012, which is the date corresponding to this particular heat map. For example, in some implementations, the heat map represents photos of grizzly bears taken relative to May 16, 2012. For example, in some implementations, the photos may be photos taken on May 16, 2012. In some implementations, the photos may be photos taken during a predetermined time frame (e.g., a day, a month, a year, etc.) or range of dates before May 16, 2012.

In some implementations, system 102 may also cause a control 506 to be displayed in the user interface. As shown in this particular example, control 506 is a slider. Control 506 enables a user to change the date in order to see how the heat map changes based on time.

Figure 6:
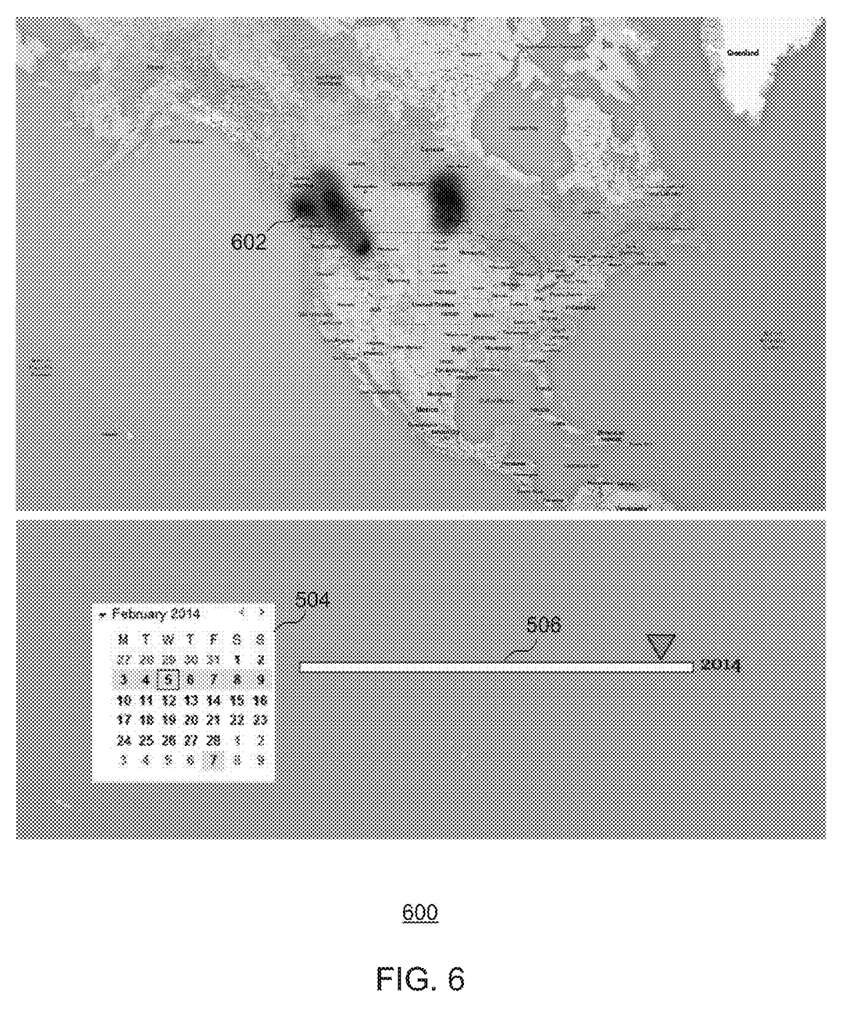
FIG. 6 illustrates an example heat map similar to that of FIG. 5 but at a different date, according to some implementations.

FIG. 6 illustrates an example heat map 600 similar to heat map 500 of FIG. 5 but at a different date, according to some implementations. As shown, calendar 504 shows a different date of Feb. 5, 2014. Also, control 506 has been moved to the right.

As shown, heat map 600 shows shaded areas 602 indicating population densities that are different compared to those of heat map 500 of FIG. 5. In other words, fewer photos of grizzly bears have been taken in association with Feb. 5, 2014 compared to May 16, 2012.

In some implementations, a given heat map associated with a given date indicates the population density of a given object on that given date. As indicated above, the photos used and/or heat map information used to generate the heat map may be associated with a predetermined time frame or range of dates. For example, in some implementations, the range of dates may include photos and associated heat map information ranging from one month before the date up until the date. The particular time frame (e.g., day(s), month(s), year(s), etc.) or range of dates may vary, depending on the particular implementations.

As shown in FIGS. 5 and 6, implementations enable users to visualize the growth of a particular species population. Changing the date using control 506 (or on calendar 504) results in system 102 rebuilding the heat map using only the pictures taken at that day or in the predetermined time range. The heat maps enable users to visualize population densities of objects such as fauna, flora, etc. change over time. Because the heat map is based on photos, users can make assumptions about the environment. For example, a given user can have a sense for changes in populations of animals, plants, etc., as well as locations of these items. Furthermore, implementations provide useful information for users to know where to travel in order to take photos of particular objects.

In some implementations, system 102 displays the heat map to a user based on one or more criteria. For example, user criteria may include date, as in the examples described above. In some implementations, system 102 updates the heat map based on user input. For example, user input may include user-movement of a slider control, as in the examples described above.

System 102 may enable users to input other criteria and input in order to generate and display heat maps. Example implementations are described in more detail below in connection with FIG. 7.

Figure 7:
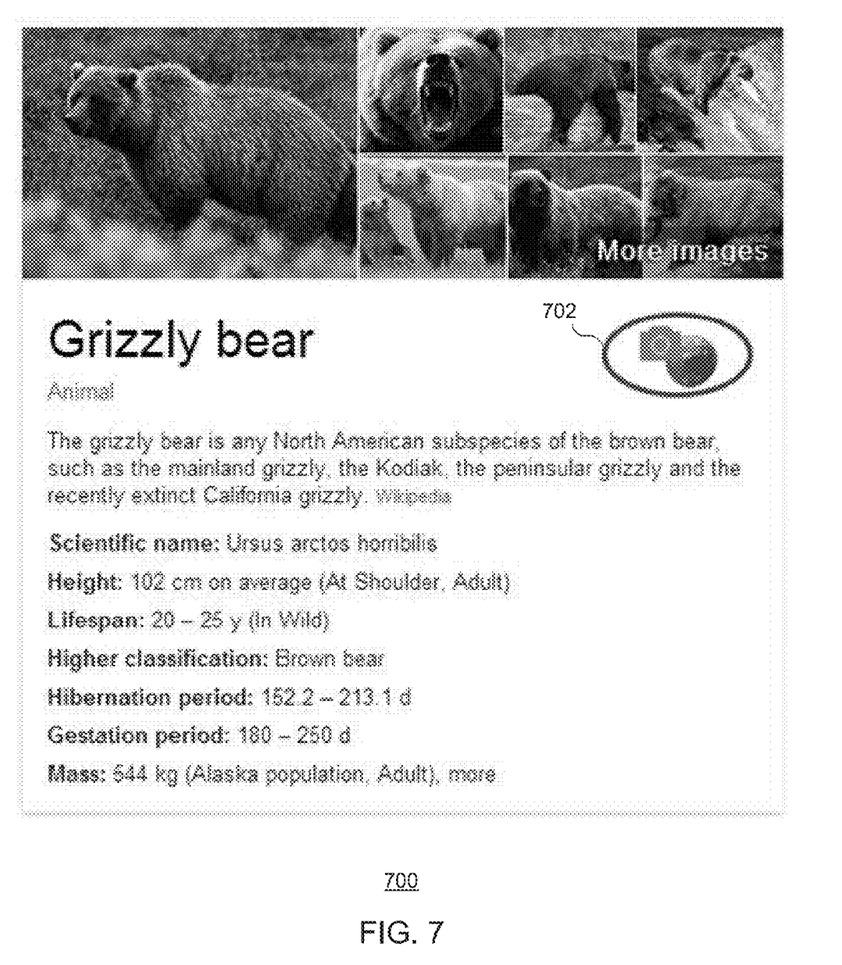
FIG. 7 illustrates an example user interface associated with an animal, according to some implementations.

FIG. 7 illustrates an example user interface 700 associated with an animal, according to some implementations. In this example, user interface 700 provides information on the grizzly bear. System 102 may cause such information to be displayed in response to a user inputting information (e.g., "grizzly bear") into a search field. In some implementations, system 102 may cause the grizzly bear information to be displayed along with other search results (e.g., to the side of a list of search results).

In some implementations, system 102 may cause a control 702 to be displayed in proximity to the information associated with the object. In response to a user selecting control 702 (e.g., clicking on control 702), system 102 may then cause a heat map such as heat map 500 of FIG. 5 to be displayed.

With the grizzly bear example, if the user searched for "grizzly bear," the heat map shows the places were pictures of that species have been taken. As indicated above, the density of photos taken in a particular geographic region reflects the population density of the target object (e.g., the grizzly bear). The user can then use the time slider to see how much of the population and the habitat has changed over the years. This visualized data may enable a user to estimate the impact of a nearby build airport in 2008 or a wildfire in 2011 on the grizzly bear, for example.

In another example, currently, wild life organizations reach out to citizens and ask them via newspaper or mail to determine and count butterflies or other insects as indicator for a healthy environment or birds returning from their wintering grounds. Such a method stands and falls with the knowledge of those people about the species and the willingness to participate. Implementations described herein utilize photos of birds, insects, flowers or any other object in nature. Such photos are taken by numerous users and hobbyists, and such photos provide ample data via heat maps for wildlife organizations. Implementations described herein utilizes photos taken every day by millions of people with their cameras, smartphones, tablets, etc.

Implementations may also apply to all kinds of objects where the growth and location information could be of value to the user. Such objects may include, for example, buildings, monuments, consumer goods such as luxury cars. As such, implementations described herein enable users to make economic assumptions regarding numerous objects.

Implementations described herein provide various benefits. For example, implementations enable users to estimate the growth rates of a species over time using photos. For example, users can view changes of populations of a particular species in a given heat map over time. Implementations also enable users to observe changes in habitats of particular species over time using photos. For example, users can view the movement of populations of a particular species in a given heat map over time. These benefits/ advantageous take advantage of the systems continual collecting of photos of numerous objects (e.g., fauna, flora, etc.) in various regions all around the world.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of recognition algorithms to recognize objects, landmarks, etc. in images. Such recognition algorithms may be integral to system 102. System 102 may also access recognition algorithms provided by software that is external to system 102 and that system 102 accesses.

In various implementations, system 102 obtains reference images of objects, where each reference image includes an image of an object that is associated with a known object or category of object. The object is known, in that system 102 has the user's identity information such as the object's name and other object information. In some implementations, a reference image may be, for example, an object image that users have uploaded. In some implementations, a reference image may be based on a composite of a group of reference images.

In some implementations, to recognize an object, system 102 may compare the object (e.g., image of the object) and match the object to reference images of the object. Note that the term "object" and the phrase "image of the object" are used interchangeably. For ease of illustration, the recognition of one object is described in some of the example implementations described herein. These implementations may also apply to each object of multiple objects to be recognized.

In some implementations, system 102 may search reference images in order to identify any one or more reference images that are similar to the object in the image. In some implementations, for a given reference image, system 102 may extract features from the image of the object in an image for analysis, and then compare those features to those of one or more reference images. For example, system 102 may analyze the relative position, size, and/or shape of object features such as facial characteristics, body characteristics, etc. In some implementations, system 102 may use data gathered from the analysis to match the object in the image to one more reference images with matching or similar features. In some implementations, system 102 may normalize multiple reference images, and compress object data from those images into a composite representation having information (e.g., object feature data), and then compare the object in the image to the composite representation for facial recognition.

In some scenarios, the object in the image may be similar to multiple reference images associated with the objects in the same category. As such, there would be a high probability that the object associated with the object in the image is the same object associated with the reference images.

In some implementations, to facilitate in object recognition, system 102 may use geometric recognition algorithms, which are based on feature discrimination. System 102 may also use photometric algorithms, which are based on a statistical approach that distills an object feature into values for comparison. A combination of the geometric and photometric approaches could also be used when comparing the object in the image to one or more references.

Other recognition algorithms may be used. For example, system 102 may use recognition algorithms that use one or more of principal component analysis, linear discriminate analysis, elastic bunch graph matching, hidden Markov models, and dynamic link matching. It will be appreciated that system 102 may use other known or later developed recognition algorithms, techniques, and/or systems.

In some implementations, system 102 may generate an output indicating a likelihood (or probability) that the object in the image matches a given reference image. In some implementations, the output may be represented as a metric (or numerical value) such as a percentage associated with the confidence that the object in the image matches a given reference image. For example, a value of 1.0 may represent 100% confidence of a match. This could occur, for example, when compared images are identical or nearly identical. The value could be lower, for example 0.5 when there is a 50% chance of a match. Other types of outputs are possible. For example, in some implementations, the output may be a confidence score for matching.

For ease of illustration, some example implementations described above have been described in the context of a recognition algorithm. Various recognition algorithms and/or visual search systems may be used to recognize objects such as landmarks, logos, entities, events, faces, etc. in order to implement implementations described herein.

Figure 8:
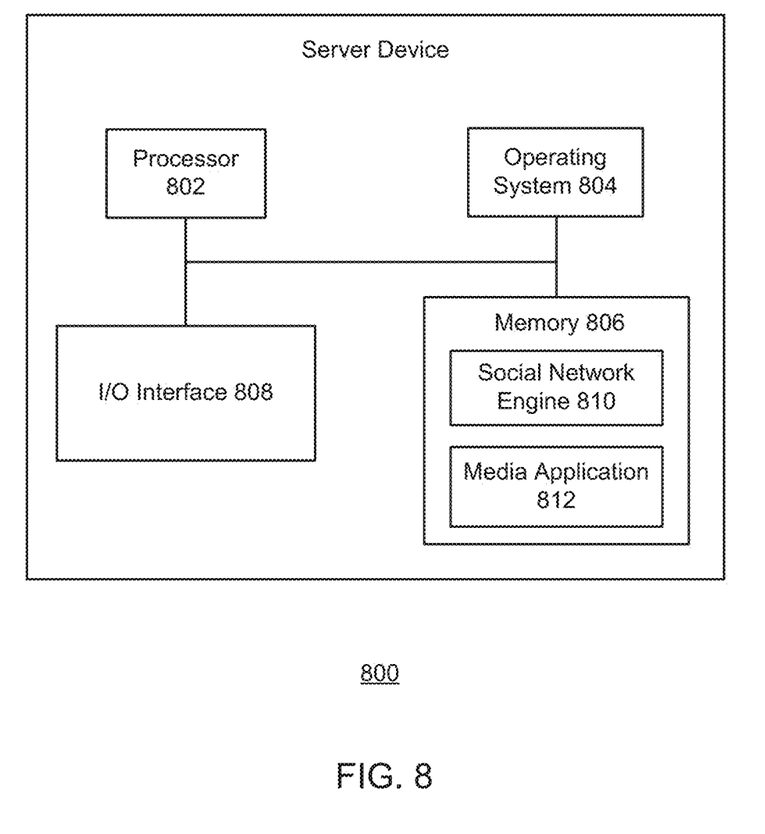
FIG. 8 illustrates a block diagram of an example server device, which may be used to implement the implementations described herein.

FIG. 8 illustrates a block diagram of an example server device 800, which may be used to implement the implementations described herein. For example, server device 800 may be used to implement server device 104 of FIG. 1, as well as to perform the method implementations described herein. In some implementations, server device 800 includes a processor 802, an operating system 804, a memory 806, and an input/output (I/O) interface 808. Server device 800 also includes a social network engine 810 and a media application 812, which may be stored in memory 806 or on any other suitable storage location or computer-readable medium. Media application 812 provides instructions that enable processor 802 to perform the functions described herein and other functions.

For ease of illustration, FIG. 8 shows one block for each of processor 802, operating system 804, memory 806, I/O interface 808, social network engine 810, and media application 812. These blocks 802, 804, 806, 808, 810, and 812 may represent multiple processors, operating systems, memories, I/O interfaces, social network engines, and media applications. In other implementations, server device 800 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:
1. A method comprising:
identifying features from each of a set of photos;
comparing the features to one or more reference images to identify at least one object;
collecting photos associated with the at least one object from the set of photos, wherein the photos are collected from a plurality of users;
determining heat map information associated with the photos, wherein the heat map information comprises geolocation information and timestamp information for each photo;
generating a user interface that includes a heat map, a calendar configured to display a first date that corresponds to the heat map, and a slider that is configured to receive a selection of a second date from a user, wherein the heat map is based on the heat map information and wherein the heat map indicates a quantity associated with the at least one object and associated with one or more geographic regions; and updating the heat map based on the user selecting the second date and based on the timestamp information associated with the photos associated with the at least one object.

2. The method of claim 1, wherein the heat map is provided to the user responsive to the user searching for the at least one object.

3. The method of claim 1, further comprising updating the heat map based on geolocation information associated with the photos associated with the at least one object.

4. The method of claim 1, wherein the one or more reference images are associated with a known object or a category of object.

5. A method comprising:
collecting photos containing at least one object, wherein the photos are collected from a plurality of users;
identifying features from each of the photos;
comparing the features to one or more reference images to identify the at least one object;
determining heat map information associated with the photos;
generating a heat map based on the heat map information, wherein the heat map indicates a quantity associated with the at least one object and associated with one or more geographic regions;
receiving a search from a user for the at least one object;
providing the user with search results that correspond to the at least one object and an option to view the heat map responsive to selecting an icon;
receiving a selection of the icon; and
providing the user with a user interface that includes the heat map and a calendar that displays a date that corresponds to the heat map.

6. The method of claim 5, wherein the heat map information comprises geolocation information for each photo.

7. The method of claim 5, wherein the heat map information comprises timestamp information for each photo.

8. The method of claim 5, wherein the heat map information comprises metadata associated with the at least one object.

9. The method of claim 5, wherein the at least one object is an animal.

10. The method of claim 5, wherein the one or more reference images are associated with a known object or a category of object.

11. The method of claim 5, further comprising updating the heat map based on timestamp information associated with the photos containing the at least one object.

12. The method of claim 5, further comprising updating the heat map based on geolocation information associated with the photos containing the at least one object.

13. The method of claim 5, further comprising:
displaying the heat map to a target user based on one or more criteria; and
updating the heat map based on user input.

14. A system comprising:
one or more processors; and
logic encoded in one or more tangible media for execution by the one or more processors and when executed operable to perform operations comprising:
collecting photos associated with at least one object, wherein the photos are collected from a plurality of users;
identifying features from each of a set of photos;
comparing the features to one or more reference images to identify at least one object;
determining heat map information associated with the photos;
generating a heat map based on the heat map information, wherein the heat map indicates a quantity associated with the at least one object and associated with one or more geographic regions;
receiving a search from a user for the at least one object;
providing the user with search results that correspond to the at least one object and an option to view the heat map responsive to selecting an icon;
receiving a selection of the icon; and
providing the user with a user interface that includes the heat map and a calendar that displays a date that corresponds to the heat map.

15. The system of claim 14, wherein the heat map information comprises geolocation information for each photo.

16. The system of claim 14, wherein the heat map information comprises timestamp information for each photo.

17. The system of claim 14, wherein the heat map information comprises metadata associated with the at least one object.

18. The system of claim 14, wherein the at least one object is an animal.

19. The system of claim 14, wherein the one or more reference images are associated with a known object or a category of object.

20. The system of claim 14, wherein the logic when executed is further operable to perform operations comprising updating the heat map based on timestamp information associated with the photos containing the at least one object.

* * * * *